P. B. MOELLER.
AUTO DIRECTION SIGNAL.
APPLICATION FILED AUG. 5, 1921.

1,405,314.

Patented Jan. 31, 1922.
2 SHEETS—SHEET 1.

Inventor
P. B. Moeller

By Victor J. Evans
Attorney

P. B. MOELLER.
AUTO DIRECTION SIGNAL.
APPLICATION FILED AUG. 5, 1921.
1,405,314.
Patented Jan. 31, 1922.
2 SHEETS—SHEET 2.
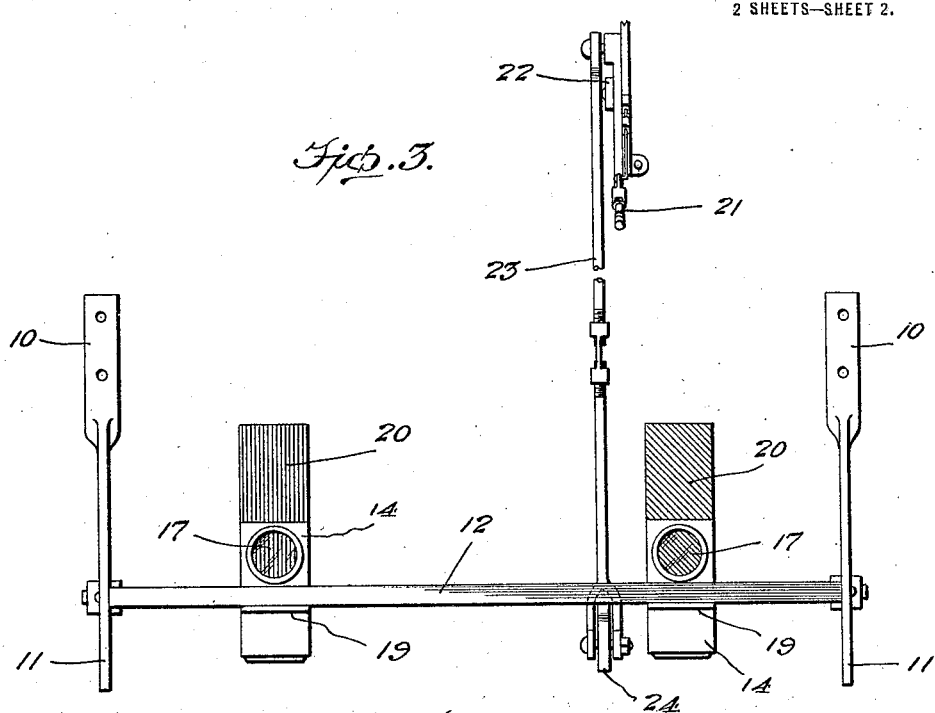
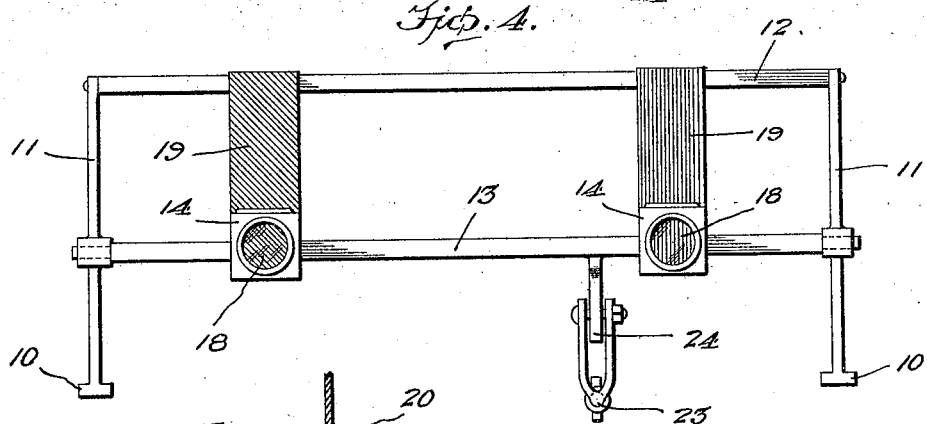
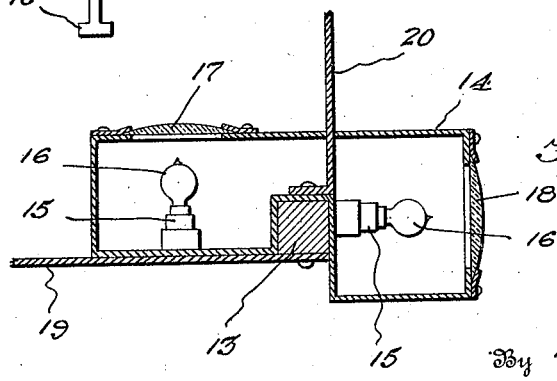
Inventor
P. B. Moeller
By Victor J. Evans
Attorney

UNITED STATES PATENT OFFICE.

PETER B. MOELLER, OF FLINT, MICHIGAN.

AUTO DIRECTION SIGNAL.

1,405,314.     Specification of Letters Patent.     Patented Jan. 31, 1922.

Application filed August 5, 1921. Serial No. 490,008.

*To all whom it may concern:*

Be it known that I, PETER B. MOELLER, a citizen of the United States, residing at Flint, in the county of Genesee and State of Michigan, have invented new and useful Improvements in Auto Direction Signals, of which the following is a specification.

This invention relates to signalling devices, particularly to direction signals for use upon motor vehicles and the like, and has for its object the provision of a novel signalling device adapted to be mounted upon a motor vehicle whereby the operator thereof may apprise the drivers of following vehicles of an intended change in the direction of travel, the great advantage of the construction being that it tends to lessen the danger of collision and also prevent congestion of traffic as well as avoiding accidents.

An important and more specific object is the provision of a signalling device of this character which includes a pair of lamps rotatably mounted at the rear of a motor vehicle each lamp having a green lens and a red lens having reflectors of the same color associated therewith, means being provided whereby to swing the lamps into such position that either color will be displayed at the right or the left as the case may be to indicate a contemplated turn.

Another object is the provision of a device of this character which is equally well adapted for use by day or by night inasmuch as the reflectors associated with the lamps are colored and have the same utility as semaphore arms or other signalling devices.

An additional object is the provision of a signalling device of this character which will be simple and inexpensive in manufacture, easy to install, highly efficient in use, positive in action, durable and a general improvement in the art.

Figure 1:
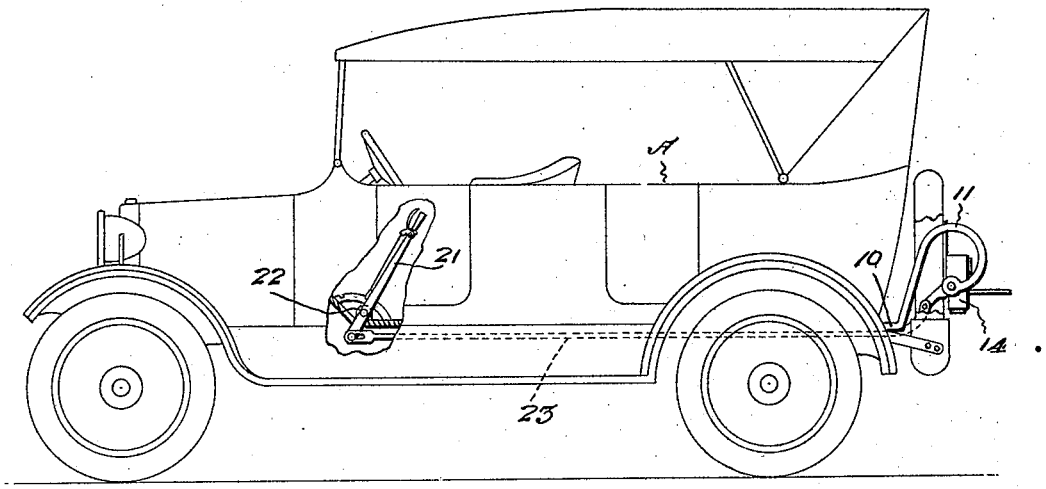
Figure 2:
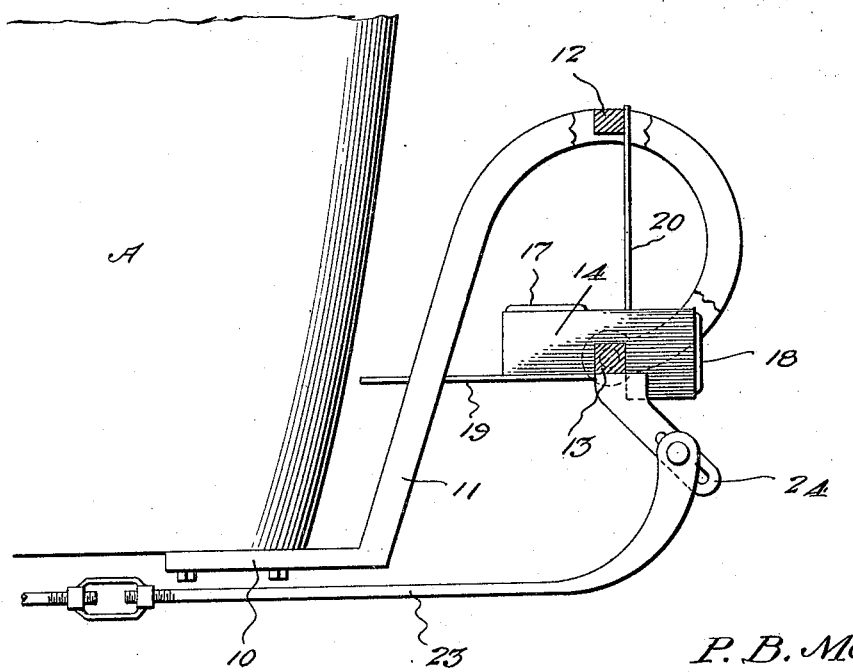

With the above and other objects and advantages in view, the invention consists in the details of construction to be hereinafter more fully described and claimed, and illustrated in the accompanying drawings in which, Figure 1 is a side elevation of my device applied to a motor vehicle, the vehicle being shown in longitudinal sections, Figure 2 is a view similar to Figure 1 but on a larger scale, and showing a different position of the signal members, Figure 3 is a plan view of my structure alone, Figure 4 is a rear elevation thereof, Figure 5 is a detail sectional view through one of the last members, and The remaining figures are detail views.

Referring more particularly to the drawings the letter A designates a portion of the body of a motor vehicle with which my device is associated. In carrying out my invention I provide a frame which includes a pair of longitudinally extending bars 10 suitably secured at the rear end of the vehicle body A and provided at their rear extremities with upwardly extending members 11 connected by a cross-bar 12 and through which is journaled a horizontally disposed shaft 13.

Secured upon the shaft 13 are two signalling devices which are similar and each of which includes a lamp box 14 within which is secured a suitable socket 15 carrying an electric light bulb 16. Each box 14 is of angular shape and is formed with openings covered by lenses 17 and 18, one of which is red and the other of which is green. These lamp boxes 14 are so arranged and constructed that the green lens in one occupies the same position as the red lamp in the other and vice versa. Associated with each lamp box 14 is a pair of reflectors 19 and 20 which are arranged at right angles to each other as clearly shown and which are colored to correspond with the associated lenses 17 or 18 as the case may be. In actual practice these reflectors are formed as flat metallic plates suitably secured with respect to the lamp boxes 14. The arrangement is such that the reflector associated with and designed to be disposed to the rear of the red lens portion of each lamp box is colored red and the reflector associated with the green lens is colored green as will be readily apparent. When the lamp boxes are in one position it will be seen that the reflectors will be in such position that two of the reflectors will engage against the cross-bar 12 while the other two extend either forwardly or rearwardly with respect thereto and at right angles thereto.

Mounted at some location within convenient reach of the driver or operator of the vehicle equipped with my device is a lever 21 which is pivoted upon a suitable supporting bracket 22 and which has its lower end connected by a link 23 with an arm 24 carried by the shaft 13. In the operation of the device it will be seen that when the lever 21 is at one limit of its movement the shaft 13 will be in such a position that the lamp boxes 14 carried thereby will display either the red or a green light to the rear of the vehicle depending upon the position of the operating lever. Assuming that the operator of the vehicle intends to make a turn to the right, it is intended that the lever 21 be pulled rearwardly whereupon the shaft 13 will be rocked so as to bring the lamp boxes 14 into such position that the lamp at the left of the machine will display a green light while the lamp at the right side of the machine will display a red light. When it is intended to make a turn to the left, it is necessary to swing the lever 21 forwardly whereupon the lamp at the right of the vehicle will display a green light while the lamp box at the left will display a red light. Owing to the fact that the reflectors are colored to correspond with the associated or adjacent lenses, it will be apparent that the device is equally well adapted for use by day as by night for the reason that the colored reflectors even though unilluminated by the incandescent bulb will be clearly visible to the drivers of following traffic so that they will be effectually apprised of the contemplated change in the direction of travel of the vehicle equipped with my signal. It is also of course to be understood that when the device is used in daytime it is unnecessary to have the bulbs 16 energized and it is therefore preferable to provide a suitable switch mechanism, not shown, in the circuit whereby these bulbs may be cut out and signalling be effected merely by means of the colored reflectors which in this instance constitute semiphore arms.

From the foregoing description and the study of the drawings it will be apparent that I have thus provided a very simply constructed and consequently inexpensive signalling device which may be readily installed upon an already existing automobile without necessitating any changes or alterations in the construction thereof, the device being very effective in use for apprising the drivers of following vehicles of any contemplated change in the direction of travel of the vehicle equipped with my device. Owing to the extreme simplicity of the parts it will be readily apparent that there is practically nothing to get out of order and that the device will consequently have an extremely long life. It is also to be observed that the invention is of such a nature that it is capable of being used equally well by day or by night owing to the provision of the incandescent bulbs which illuminate the lamp boxes at night and to the provision of the colored reflectors which correspond to the lenses of the lamp boxes and which enable the device to be used by day.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. An automobile direction signal comprising a supporting frame mounted upon the rear end of an automobile, a horizontal shaft journaled transversely of said frame, a pair of lamp boxes carried by said shaft and each provided with a red lens and a green lens and containing an incandescent bulb, and lever operated means positioned within convenient reach of the driver whereby to swing said shaft to bring said lamp boxes into position with either selected lens displaying a colored light, the different colored lenses of the respective lamp boxes being arranged in alternation, and a pair of reflectors carried by each lamp box and colored to correspond with the associated lens, a cross-bar forming a part of the supporting structure, and said reflectors being engageable with the rear edge or the forward edge of said cross-bar whereby to define the position of the reflectors and consequently the lamp boxes.

2. A signaling device for automobiles comprising a supporting frame secured upon the rear end of an automobile and including a cross-bar, a horizontal shaft journaled transversely of said frame, a pair of lamp boxes secured upon the shaft and each having a red lens and a green lens containing illuminating incandescent bulbs, the green lens of one lamp box being in the same relation as the green lens of the other, a lever pivoted within convenient reach of the driver, a link pivotally connected with said lever, an arm carried by said shaft pivotally connected with said link, and reflectors carried by each lamp box and colored to correspond with the adjacent lens, said reflectors being engageable either with the forward or the rear edge of the cross-bar as the case may be whereby to limit swinging movement of the lamp boxes when said shaft is moved by said lever.

In testimony whereof I affix my signature.

PETER B. MOELLER.